Sept. 30, 1941.　　E. F. FLINT ET AL　　2,257,232

LIGHT PROJECTOR

Filed July 21, 1939

EDWARD F. FLINT
JOHN R. MILES
INVENTORS

BY

ATTORNEYS

Patented Sept. 30, 1941

2,257,232

UNITED STATES PATENT OFFICE 2,257,232

LIGHT PROJECTOR

Edward F. Flint, Rochester, and John R. Miles, Brighton, N. Y., assignors to Bausch & Lomb Optical Company, Rochester, N. Y., a corporation of New York Application July 21, 1939, Serial No. 285,768

5 Claims. (Cl. 240—47)

The present invention relates to light projectors. In light projectors such as microscope illuminators, image projectors or the like, high intensity light sources are used and large amounts of heat are generated by these sources. The lamphouses are thus unduly heated and the operator of the projector is frequently burned by accidentally touching the lamphouse.

One of the objects of the present invention is to provide a light projector in which the lamphouse is protected from excessive heating so that the danger of burning the hands of the operator is eliminated. Another object is to provide a new and improved heat shield for light projectors. A further object is to provide a light projector in which the heat is absorbed by a shield and the shield is cooled by convection or conduction or both. These and other objects and advantages reside in certain novel features of construction, arrangement and combination of parts as will hereinafter be more fully set forth and pointed out in the appended claims.

Referring to the drawing.

Figure 1:
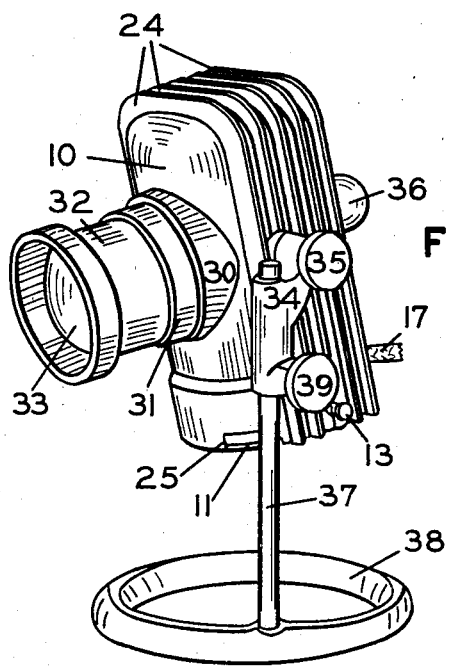
Fig. 1 is a perspective view of a light projector embodying the invention.
Figure 3:
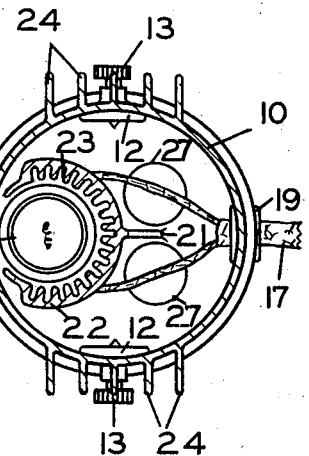
Fig. 3 is a section taken on line 3—3 of Fig. 2.
Figure 2:
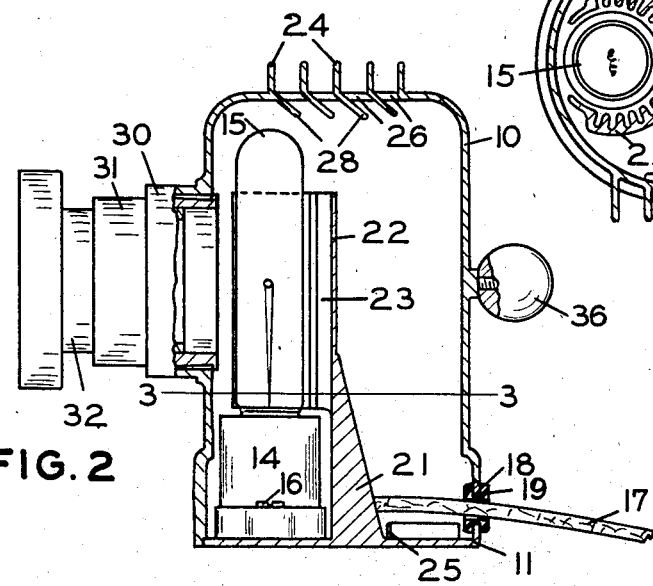
Fig. 2 is a vertical section thereof.

The drawing shows a light projector such as a microscope lamp embodying one preferred form of the present invention. In the embodiment shown, 10 designates the lamphouse which is closed at the bottom by a removable base 11. This base 11 is formed with two upstanding lugs 12 which fit inside the walls of the housing 10 and two screws 13, extending through the lamphouse walls, engage the lugs 12 to secure the base 11 in position. A lamp socket 14 carrying an incandescent lamp 15, is suitably secured on the base 11 by screws 16, for example, and current is supplied to the lamp 15 by the usual cord 17. This cord enters the housing 10 through an opening 18 in the base 11 and may be protected by an insulating bushing 19.

An upright 21 is secured to the base 11 immediately adjacent the socket 14, and carries a heat shield 22 which partially surrounds and encloses the lamp 15. The lamphouse 10, base 11, upright 21 and shield 22 are preferably all made of metal and the base 11, upright 21 and heat shield 22 may be die-cast in a single piece. In any event, the heat shield 22 itself is preferably made of metal having a relatively high thermal conductivity.

The surface of the shield 22 facing the lamp 15 is preferably blackened to increase its heat absorption, and is formed with a series of longitudinal fins or ribs 23. These fins 23 not only increase the surface area of the shield 22 but also reduce the amount of light or heat reflected back to the lamp 15. The outer surface of the shield 22 is preferably bright or reflecting so that the heat radiated by the shield to the walls of the lamphouse 10 is kept at a minimum. The inside walls of the lamphouse 10 are also preferably bright or reflecting so that any heat radiated by the shield 22 will be reflected rather than absorbed by the lamphouse 10. The outside of the lamphouse 10 is preferably blackened or otherwise treated to increase its radiation and suitable radiating fins 24 may be provided. The shield 22 thus absorbs a very large percentage of the heat from the lamp 15 and the two bright or reflecting surfaces prevent or minimize the transfer of this heat from the shield 22 to the lamphouse 10 by radiation.

In order to cool the shield 22 and remove heated air, the lamphouse 10 is provided with ventilating openings 25 adjacent the base 11 and other ventilating openings 27 are formed in the base 11 itself. The top of the housing 10 is provided with further openings 26 between the fins 24 and louvers 28 prevent the escape of light through the openings 26.

When the lamp 15, which is usually of the high intensity, projection type, is lit, heat is generated and air is drawn through the housing 10 by convection. Due to the fact that the lamp 15 and shield 22 are quite hot and close together, a large quantity of air will be drawn upward between them at a rapid rate. This air passes over and between the fins 23 and because of the surface area of the fins, carries away much of the heat from the shield 22. The rate of flow and the quantity of this air is such that the air itself does not become unduly heated and does not overheat the top of the housing 10.

Another portion of the heat of the shield 22 is conducted to the base 11 by the upright 21. This may cause the base 11 to become warm but as the base is relatively inaccessible and not likely to be touched by the operator, such local heating is relatively immaterial.

Directly in front of the lamp 15, the housing 10 has a light opening surrounded by a tube 30. Various optical attachments such as lenses, diaphragms or the like may be mounted on this tube 30. In the embodiment illustrated as an example, a lens mount 31 is suitably secured in this tube 30 by a bayonet lock, for example, and a sleeve 32 carrying a suitable condensing lens 33 is slidable in the mount 31.

The lamphouse 10 is pivotally mounted on a carriage 34 for movement about a horizontal axis and a suitable nut 35 serves to lock the lamphouse in tilted position. A knob 36 fixed on the rear of the housing 10 forms a convenient and accessible handle for tilting the lamphouse.

The carriage 34 is vertically slidably mounted on an upright column 37 fixed on an annular support 38. The carriage 34 may be raised or lowered on the column 37 to change the elevation of the lamphouse and a screw 39 serves to lock the carriage 34 in selected position. As shown in Fig. 1, the inner radius of the support 38 is larger than the radius of the lamphouse 10 so that the lamphouse may be lowered into contact with the table on which the support 38 rests.

From the foregoing, it will be apparent that we are able to attain the objects of our invention and provide a light projector in which the lamphouse is shielded from the heat of the lamp that it does not become sufficiently hot to burn the hands of the operator. Various modifications can, of course, be made without departing from the spirit of our invention or the scope of the appended claims.

We claim:

1. In a light projector of the type having an incandescent lamp with a housing therefor, a shield for protecting said housing from the heat of the lamp, said shield comprising a metallic body partially surrounding the lamp and so positioned as to form a narrow passageway between the lamp and the side of the shield adjacent thereto, the side of the shield adjacent the lamp having a dulled surface to increase the ability of the shield to absorb and also to radiate heat and the side of the shield away from the lamp having a brightened surface to decrease the ability of the shield to absorb and radiate heat.

2. A light projector having a housing formed of heat absorbing material, a lamp within said housing, a metallic heat absorbing mass providing a shield partially surrounding said lamp and so positioned as to form a narrow passageway between the lamp and the side of said mass adjacent thereto, the side of said mass adjacent to said lamp provided with a dulled surface having longitudinal fins thereon, a second metallic heat absorbing mass forming a base for said projector, means connecting said heat absorbing masses whereby heat absorbed by said first-mentioned mass is transmitted by conduction to said second-mentioned heat absorbing mass, the side of said first-mentioned heat absorbing mass away from said lamp and also the interior of said housing each provided with a brightened surface, the exterior of said housing provided with a dulled surface and means utilizing convection currents for ventilating the housing by drawing air into the housing and passing said air through said passageway and also through that part of the housing exterior to and surrounding said lamp and first-mentioned heat absorbing mass and then out of said housing.

3. In a light projector of the type having an incandescent lamp within a housing formed of heat absorbing material and provided with ventilating openings, a shield for protecting said housing from the heat of said lamp, said shield having a metallic body partially surrounding the lamp and positioned in relative close proximity thereto, a plurality of longitudinal fins formed upon the side of said shield adjacent said lamp and means assisting to prevent the heating of said housing beyond a temperature safe for contact with the human body comprising a substantially non-reflecting surface formed on the side of the shield adjacent said lamp and on the exterior of said housing and a reflecting surface formed on the side of the shield away from said lamp and on the interior of said housing.

4. A light projector having a housing provided with ventilating openings and a light opening, an incandescent lamp mounted in the housing, a shield having a metallic body partially surrounding said lamp and positioned in close proximity thereto, the side of the shield adjacent the lamp having a dulled surface and the opposite side of the shield having a brightened surface and means for conducting heat away from said shield and to a selected part of said housing comprising a metallic upright supporting said shield from said housing.

5. A light projector having a housing formed with a base, top and sides of heat absorbing material, said housing provided with ventilating openings and a light opening, an incandescent lamp mounted in the housing, a shield having a metallic body partially surrounding said lamp and positioned in close proximity thereto, the side of the shield adjacent the lamp having a dulled surface and the opposite side of the shield having a brightened surface and means for conducting heat absorbed by said shield to said base comprising a relatively massive upright supporting said shield and connected to said base, said upright having a longitudinal cross section which increases in width from the shield to said base.

EDWARD F. FLINT.
JOHN R. MILES.